United States Patent [19]
Lary

[11] Patent Number: 5,323,443
[45] Date of Patent: Jun. 21, 1994

[54] X-RAY FILM MARKING SYSTEM

[75] Inventor: Banning G. Lary, 6370 SW. 87 Ter., Miami, Fla. 33143

[73] Assignee: Banning G. Lary, Miami, Fla.

[21] Appl. No.: 919,192

[22] Filed: Jul. 24, 1992

[51] Int. Cl.⁵ .............................................. H05G 1/28
[52] U.S. Cl. ..................................... 378/165; 378/162
[58] Field of Search .................................. 378/162–166

[56] References Cited

U.S. PATENT DOCUMENTS 3,573,455  4/1971  Suierveld ............................. 378/162
4,788,707  11/1988  Malamud et al. ..................... 378/162

Primary Examiner—Craig E. Church

[57] ABSTRACT

A uniform system for marking X-Ray films with pertinent data. Further, it establishes a technique for manufacturing X-Ray markers which vary only slightly, so that by piggy-backing or stacking, virtually any thickness of marker can be obtained. In addition a method for making a transparent, adherent, and reusable marker is described. The markers are made of brass by a photo-chemical-etching technique and are coated with nickel in order to achieve permanency and contrast against a black plastic background for easy identification and storage.

1 Claim, 3 Drawing Sheets

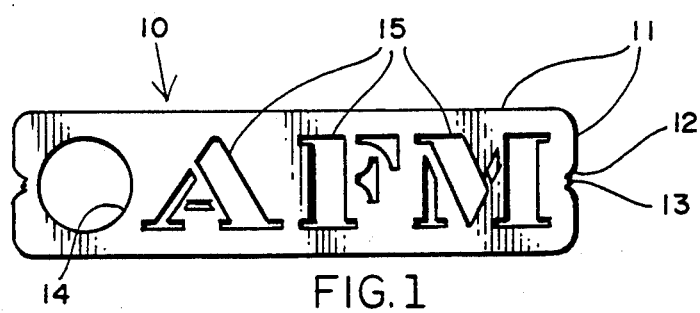
FIG. 1
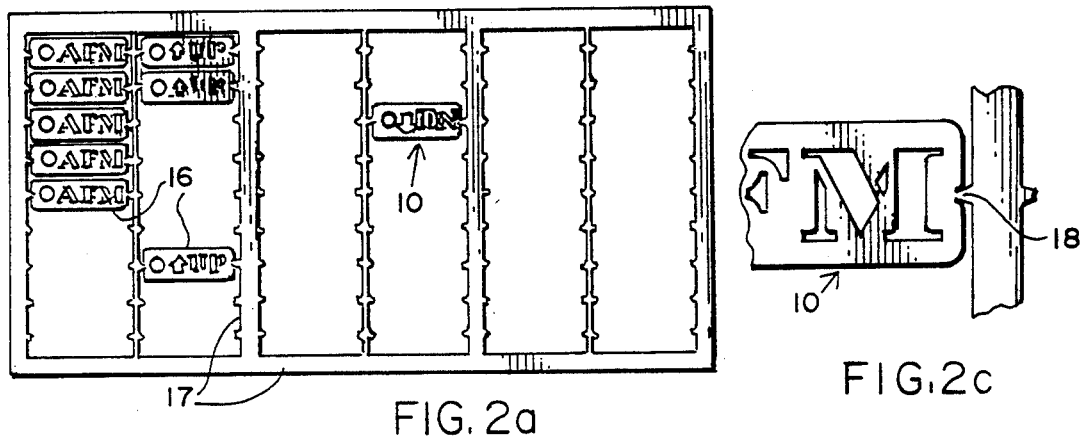
FIG. 2a
FIG. 2c
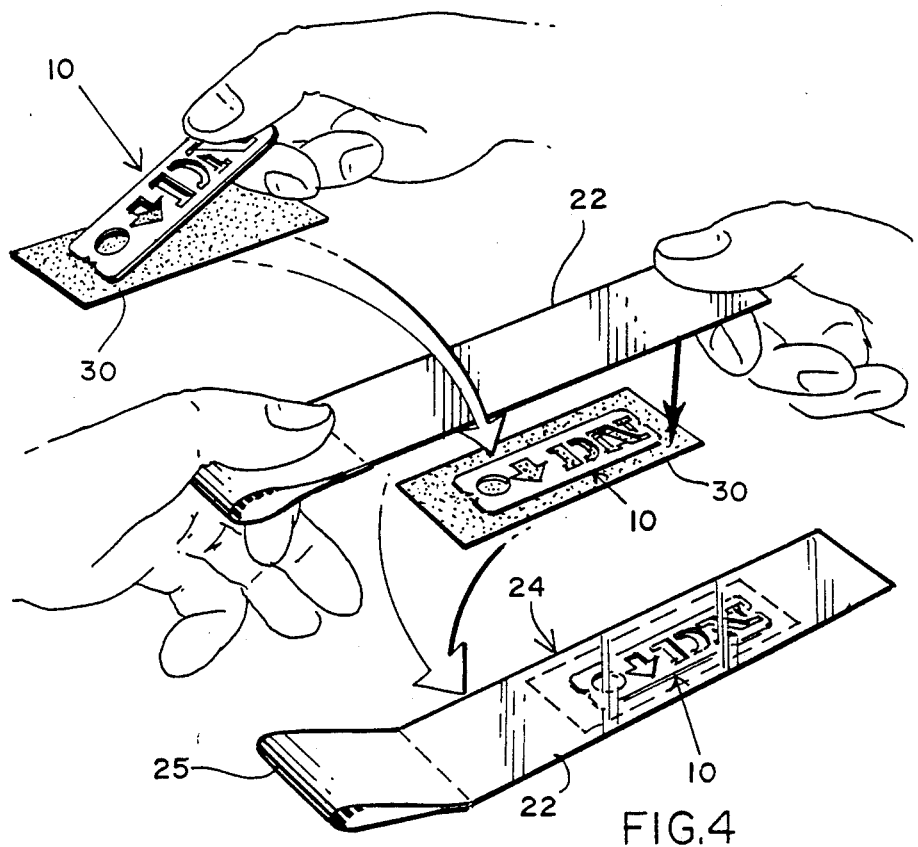
FIG. 4

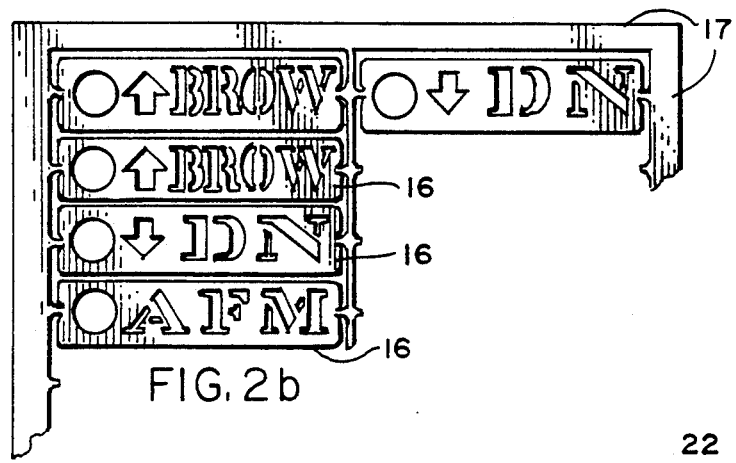
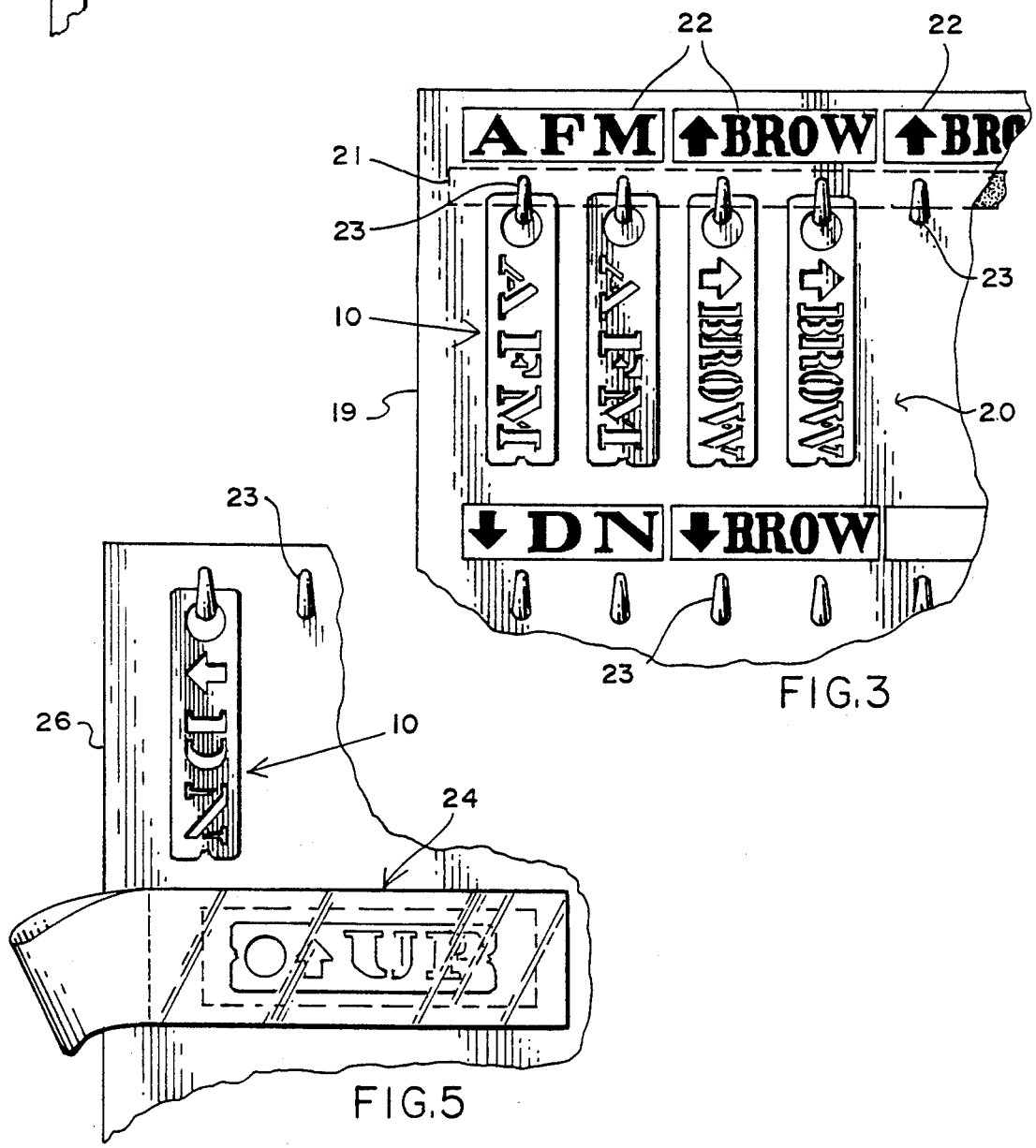

X-RAY FILM MARKING SYSTEM

BACKGROUND OF INVENTION

1. Field of Invention-

The invention relates generally to a system for correctly identifying the type of X-Ray exposure performed. More particularly, the invention concerns a system which permits the use of substances other than lead to correctly and permanently mark X-Ray films taken for diverse conditions and with differing intensities of radiation exposure.

2. Description of Prior Art and Background of Invention-

Roentgen or X-Ray examinations, particularly for medical purposes, require not only the name and other statistics of the patient, but often the position of the patient, times after injections, specific and particular views, respiratory states, identification of the technician and other pertinent information. This information is supplied by an identifying marker which is permanently imprinted on the developed X-Ray film with a negative shadow due to the obstruction or absorption of X-Rays.

In the past, a variety of marking methods have been used for such identification. Generally, these have consisted of stamped or cast flat lead pieces. The exposed lead pieces are usually stored in open boxes divided in cubicles and are removed manually by the technician. Some of them are embedded in plastic and partially encased in aluminum. Frequently a hole is fashioned at one end by which they are hung on hooks in a random fashion and without organization. This results in time lost searching for the correct marker. Another method uses a clip-marker combination attached to the periphery of an X-Ray cassette. At times these do not imprint on the developed film because of their peripheral position. Yet another uses powdered lead contained between plastic tapes on which symbols can be written. These are cut in any desired length and again are attached to the cassette by opaque surgical adhesive. On the back of the opaque tape the type of marker concealed by the tape is written in ink for identification purposes. These are adhered to random sites when not being used.

While some markers are clipped to the edge of the film cassette, the majority are taped to the X-Ray film cassette or on the X-Ray table. At times, the cassette is placed on a "Buckey-Tray" beneath the X-Ray table, which carries the film cassette behind (or underneath) the patient and permits repeated exposures, without raising the patient to remove the film.

There exists disadvantages to each of the describe marking objects and methods:

First and foremost, they require the use of inorganic lead which is a poisonous substance. The powdered lead tape, in particular, permits the dissemination of lead into the environment. This occurs when the tape containing the powdered lead is cut across in order to obtain a marker of 2-4 inches in length. In addition to its toxicity, lead deposits on film cassette holders and X-Ray tables, so that particulate lead matter causes artifacts which can appear on the exposed X-Ray film. The stamped or cast lead markers that are not encased in plastic continue environmental contamination. In addition, they are handled by unprotected personnel.

Secondly, the common lead markers which are embedded in plastic and encased around the periphery with an aluminum frame, are too thick to be used in a "Buckey-Tray" because they can be easily scraped off and lost in the X-Ray table mechanism. In addition, research reveals no evidence that lead does not leach through the plastic to present in molecular forms on the surface. The lead tape may also be lost in X-Ray tables, and this is more serious since manipulating it for removal can cause the powdered lead to be spilled on the worker and within the X-Ray table. Expensive and time-consuming efforts are necessary to remove the lost objects and clean up the powdered lead.

The United States Environmental Protection Agency through the Toxic Substance Control Act, has instituted a concerted effort to reduce human exposure to lead through regulatory authorities. Included as one of the four major efforts in this direction is to "encourage use of substitutes for lead." Other efforts to rid the environment of lead address mining, smelting, casting and forming of the material. (OTS Candidate Pollution Prevention Project-"Lead Pollution Prevention." Jun. 30, 1989 and "U.S. Environmental Protection Agency Strategy for Reducing Lead Exposures." Feb. 21, 1991).

The difficulties addressed by the present intervention have also been recognized by prior art as discovered by a pre-examination search. The most relevant references recognizing these concerns and disclosed by the search is U.S. Pat. No. 4,813,062 to Gilpatrick, M.W., entitled "Radio-opaque Marker and Method," which elucidates the potential health hazards of lead and utilized bismuth-trioxide ($Bi_2O_3$) as an alternative to make a radio-opaque crayon marker for textiles. Similarly, U.S. Pat. No. 4,274,006 to Caine, R.D., entitled "Universal X-Ray Marker," discusses the health hazards of various lead X-Ray markers and attempts to circumvent such problems by making a paste of powdered lead and sealing it. There is no reference to the concomitant health hazards of mining, smelting and mixing the lead that are necessary to that invention.

A number of other problems with only partial solutions can be found in U.S. Pat. No. 4,953,193 to Robinson, N.L., entitled "Fastening Combination Having Special Utility in Affixing on X-Ray Marking Device to a Cassette Adapted to Hold X-Ray Film." He points out the disadvantages of using opaque masking or surgical tape to affix the identifying marker to the cassette, which tape prevents the technician from visually confirming the identifying character of the marker. The present invention overcomes this objection by simply using clear transparent surgical tape, which permits identification of the marker. In addition, when discussing dislodgement of an X-Ray identifying marker, he states: (Column 1, Lines 57-64), "This is specially a problem when the drawer opening is just barely high enough to allow the cassette to pass through the opening. That is, when the cassette drawer is being closed, a thick profile marker on top of the cassette face might accidentally contact the upper edge of the drawer opening and be repositioned or be completely dragged off of the cassette face." He describes a marker 0.18 inches thick with a gap between the marker and the cassette to facilitate grasping and repositioning. Both the thickness and the unattached periphery of such a marker would present an object that could be scraped off. The present invention demonstrates a marker 0.04 inches thick which is completely adherent all about the periphery of the marker for fixation to the cassette and has been demonstrated more difficult to be removed inadvertently from the cassette.

Further, Robinson describes attaching the marker to the cassette using the Velcro mechanism of loop and hook. Besides increasing the thickness of the marker beyond the original 0.18 inches, the loops and hooks collect threads, lint and other debris which are extremely difficult to remove and may result in artifactual problems on the exposed X-Ray film. Again, the present invention solves these problems by using clear tapes which tapes can be renewed with minimal effort and expenditure of time, should they lose adhesion or become soiled.

In U.S. Pat. No. 3,573,455 to Suierveld, J., a brass template with precisely drilled holes was used to mask the x-rays impinging on a photographic film. After such exposure, the template was removed and another exposure made of the article to be analyzed. In that context, the template was used to assure precise spatial orientation of an article during X-ray photography. This invention utilizes the template concept only as a means of efficient manufacturing X-ray markers of the same size with different information. These markers are totally removed from the template and used repeatedly for identification purposes. The periphery of the template is then discarded. Malmud, H. et al U.S. Pat. No. 4,788,707 shows a tool comprised of plastic, lead, and aluminum which was designed to indicate the correct x-ray dosage for a given matter. They also refer to a step-wedge of increasing thicknesses to measure radiation dosages. The present invention describes markers of a constant thickness used only for the identification of the subject matter. By stacking these almost identical markers one on the other, the desired imprint on film can be achieved with almost any degree of radiation.

An excellent overview of the techniques generally employed by X-Ray technicians can be found in U.S. Pat. No. 4,529,635 by Sheldon, A.D., which method, however, requires special equipment, is time-consuming and employs lead.

Other Patents referring obliquely, from the standpoint of the current invention, to X-Ray marking systems are: U.S. Pat. No. 4,127,774 to Gillen, J.; U.S. Pat. No. 4,698,836 to Minasian, J.L.; U.S. Pat. No. 4,194,122 to Mitchell, E.C., Mitchell, C.J.; and U.S. Pat. No. 2,433,480 to Rendick, R.A.

SUMMARY OF THE INVENTION

It is the object of this invention to establish a system which permits standardization of X-Ray markings and a logical system for efficient storage and repeated use. The markers are readily removed from a master template and hung on a master board. The master board and the satellite boards are comprised of black solid material such as acrylic to which plastic adhesive hooks have been placed. These boards can be secured at convenient locations by commercial double stick foam adhesive. At a work-station the X-Ray markers are placed between a clear surgical adhesive strip and a smaller clear adhesive strip. They are then attached to the black satellite station which is positioned in such a location where the particular markers are used.

It is further the object of this invention to provide a flexible system where X-Ray markers can be combined to permit an efficient single marker for any usual intensity of X-Radiation. By computer design of master mechanical drawings, precisely the same X-Ray markers can be obtained for a variety of symbols, characters, numbers and letters from different fonts. Utilizing photo-chemical-etching techniques, master templates are made which contain such markings in the desired repetition, variety and quantity. Such markings are nickel-coated for esthetics and functional purposes.

A further object of the invention is to provide a non-toxic X-Ray marker that will imprint on exposed X-Ray film and image currently achieved by the use of lead. Such materials as beryllium-copper and brass have, in varying thicknesses, been demonstrated to accurately imprint desired information on X-Ray film.

BRIEF DESCRIPTION OF THE DRAWINGS

In the drawings, wherein like reference numerals denote corresponding parties throughout the several views:

FIG. 1 is a frontal view of the marker illustrating the subject information with a hanging hole at one end and indentation at each end.

FIG. 2a illustrates the master template comprising of varying letters, numbers, and types of markers.

FIG. 2b is an enlarged view of a section of the master template illustrating the almost identical nature of each marker.

FIG. 2c illustrates the rhomboidal attachment of the marker to the template.

FIG. 3 illustrates a section of the master station which is labeled according to each marker, and to which adhesive plastic hooks have been attached, and on which the corresponding markers are hung.

FIG. 4 illustrates the method used to make an adherent marker.

FIG. 5 illustrates a section of black satellite board with markers, hooks and adherent markers for a specific type of examination.

DETAILED DESCRIPTION OF THE PREFERRED EMBODIMENT

Figure 6:
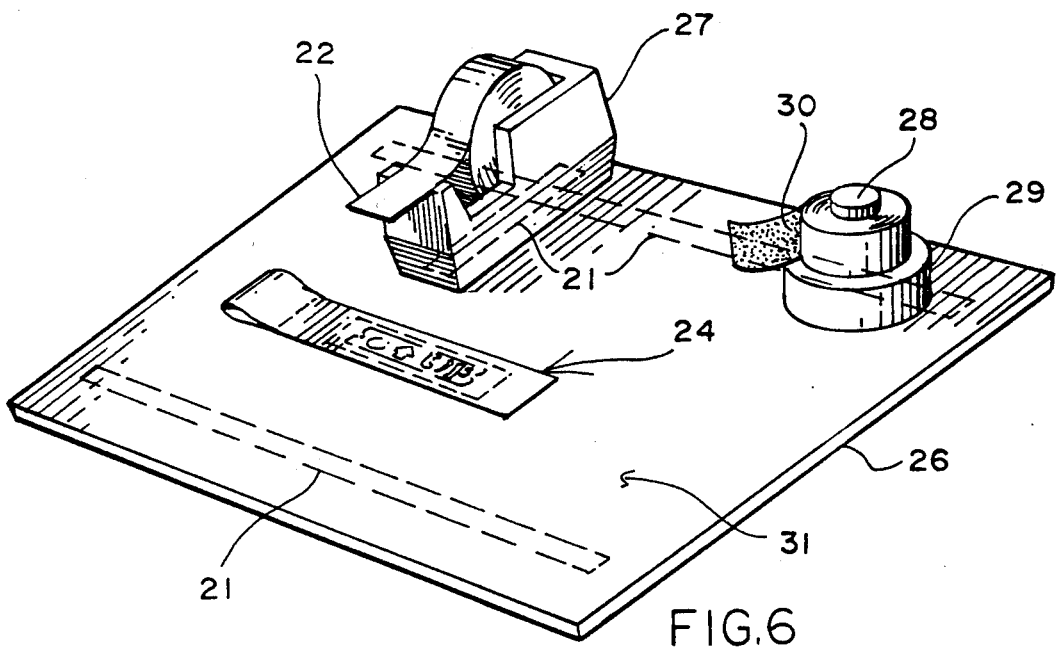
FIG. 6 illustrates a work-station consisting of one adhesive tape dispenser and a spindle dispenser on a black rigid plastic base where markers are affixed to adhesive strips.

FIG. 1 illustrates an X-Ray marker 10 comprised of a non-toxic metallic radio-opaque strip such as brass which has been nickel-coated. A smooth periphery 11 is indented at each longitudinal end 12 with a small central tab 13 where the marker was twisted from a master template FIG. 2a. By recessing this tab within the indentation 12 injury is prevented from the sharp end of the tab which is in a protected position.

Figure 7:
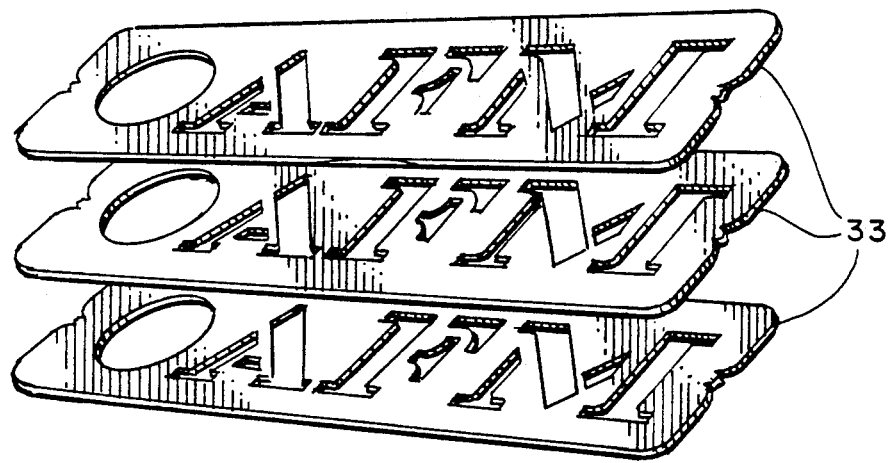
FIG. 7 illustrates stacking of identical markers to temporarily or permanently make a marker of increased density when higher doses of X-Rays are utilized.
Figure 8:
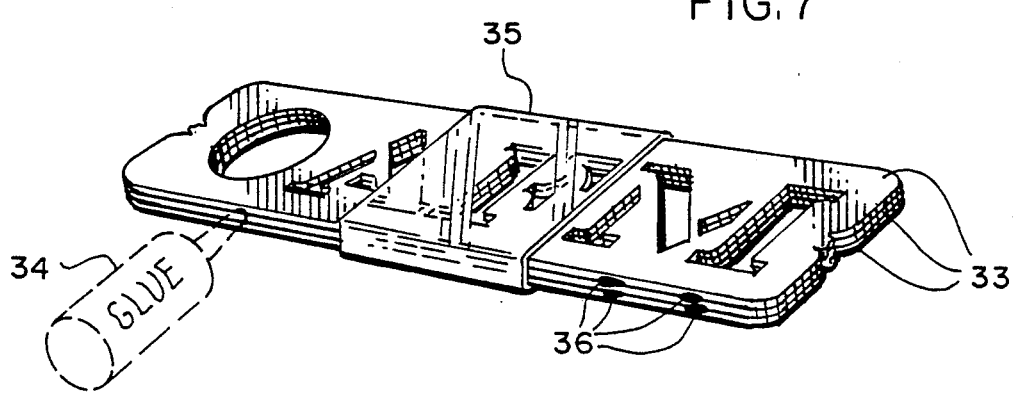
FIG. 8 illustrates methods for joining several markers.

Within the marker 10 at one end is a round opening 14 corresponding to similar openings for all other markers. this opening permits storage of the marker on a corresponding hook on a master station FIG. 3. Further, this opening helps to align identical symbols when stacking them as illustrated in FIG. 7. Also found within this metallic strip is the individual identification of the marker 15. By using photo-chemical-etching techniques and nickel-coating, almost identical jewel-like quality, and oxidation resistant markers are achieved. Such markers can be easily identified against the black background of the master station FIG. 3 and the satellite station FIG. 5.

Turning now to FIG. 2a, an illustration demonstrates a master template which contains a variety of different markers 16. The types and numbers of each marker approximates those most commonly used in the marking of X-Ray films. A heavy border and heavier longitudinal members 17 add strength to the master dye and permit the markers to be twisted free. FIG. 2b demonstrates the numerous variations of types of markers comprising the template. The almost identical nature of each permits the stacking of several similar markers. This makes possible the permanent imprinting on X-Ray films of the type of examination, the X-Ray technician performing the examination, and other pertinent information. FIG. 2c is a closer view of the attachment of the marker to the master dye. An acute rhomboidal shape 18 permits the marker to be twisted free with a minimal resistance so that the tab 13 is very small and is protected by the indentation 12.

FIG. 3 illustrates a section of the master station 19 which is comprised of a smooth black solid piece of plastic material, approximately $\frac{1}{8} \times 12 \times 24$ inches (32×3048×6056 mm) 20. Strips of double-sided adhesive foam tape 21 are placed on the back side, while on the front side are adhesive strips of printing 22 which identify the location where adhesive hooks 23 are placed on which are hung the markers 10 that correspond to the printed location. The printed markers and the base of the hooks are twice the width of the markers. This feature separates and permits ready identification and easy removal of the desired marker. A variable number of the same identical markers are hung on each corresponding hook for ready availability. The strips of industrial foam adhesive tape 21 permit immediate and permanent attachment to any flat or semi-flat surface and are customarily used to secure the master station FIG. 3, the satellite station FIG. 5, and the work-station FIG. 6.

Turning now to FIG. 4, this illustration demonstrates the method for placing and securing the marker 10 between two pieces of clear adhesive tape in order to fashion a transparent adhesive piece containing said marker. The larger adhesive strip is composed of a flexible easily tearable clear surgical-type adhesive 30. The marker is attached to this tape and secured against it with a smaller and more narrow clear tape 37 of such a consistency that it can be easily penetrated by the marker if desired. These features permit removal and re-use of the marker to form another adhesive piece should the original lose its adhesive character or become soiled with repeated use. They also permit adhesion all around the periphery of the completed adhesive piece 24. One end of the larger tape 30 can be folded on itself to provide an area to grasp 25 for easy removal from any location. Identifying initials or numbers of the X-Ray technician responsible for the examination can be collocated with the marker.

FIG. 5 demonstrates a portion of a satellite station 26 which is normally dedicated to an X-Ray room where a specific type of examination is performed. A black smooth plastic board one-half the size of the master station 19 is attached in the same fashion with foam tape 21. Hooks 23 hold specific markers 10 at the top of the board and adhesive markers 24 are stored on the lower portion of the board, to be used and reapplied when desired.

Referring now to FIG. 6, an illustration of the work station 26 demonstrates a tape dispenser 27 with a roll of clear smaller tape 37 which dispenser is secured in one upper corner by foam tape 21. On the opposite corner is a permanent spindle arrangement which has a smaller cylinder 28 on top of a larger cylinder 29. A surgical adhesive role of tape 30 fits over the upper cylinder and is elevated and supported by the larger cylinder. Such an arrangement permits ready removal of the desired length of adhesive strip. The adhesive marker 24 is constructed on the vacant area remaining in front of the two tape dispensers 31. Foam tape secures the entire station 21.

Turning to FIG. 7, there is a diagrammatic representation showing how near identical markers 33 which when aligned can be adhered together. Two such markers together provide adequate radio-opaque density for more intense X-Ray exposures. It is even possible to stack and adhere more than two markers together to permit a density specifically designed for any radiological dosage. These markers may be held together, for example, with glue 34, tape 35, or welds 36.

Experiments have shown a single thin adhesive marker 24, when properly adhered with 2 or 3 inch adhesive tapes, can be used on the cassette when it is placed in the "Buckey-Tray" beneath the X-Ray table. This feature saves time and permits more accurate X-Ray marking since the marker can be positioned on the film cassette.

Having described the presently preferred embodiments of the invention, it should be understood that various changes in construction and arrangement will be apparent to those skilled in the art once fully contemplated herein without departing from the true spirit of the invention. Accordingly, there is covered all alternatives, modifications and equivalents as may be included within the spirit and scope of the invention as defined in the following claims.

I claim:

1. A method of marking x-ray films comprising the steps of:
    photoetching a master template of x-ray-opaque marker symbols from a thin brass sheet such that the symbols are attached to the template by small tabs that are easily removed,
    plating the master template with nickel,
    removing the symbols from the master template,
    hanging the removed symbols having apertures for this purpose from hooks provided on a storage station comprising a black plastic sheet fitted with hooks,
    transferring selected symbols from the storage station to a work station comprising a black plastic sheet including two spools of transparent adhesive tape of different sizes,
    sandwiching selected symbols between two pieces of the transparent tape,
    transferring selected taped symbols from the work station to a satellite station comprising a black plastic sheet,
    securing selected taped symbols from the satellite station on the surface of an x-ray film cassette by means of the tape,
    exposing the film-containing cassette to x rays so as to image the symbols on the film, and
    developing the film so as to render the exposed symbols readable.

* * * * *